(No Model.)
S. GISSINGER.
NUT.
No. 298,843. Patented May 20, 1884.
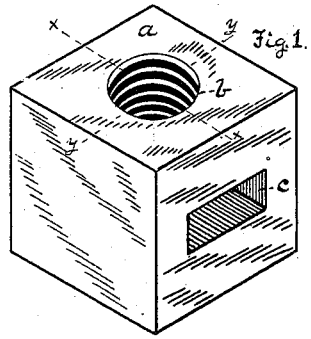
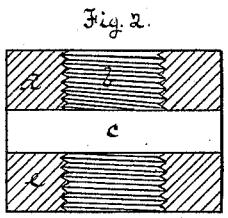
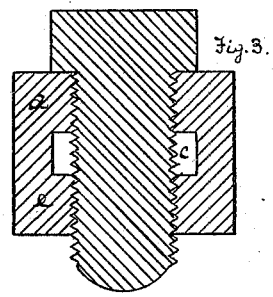
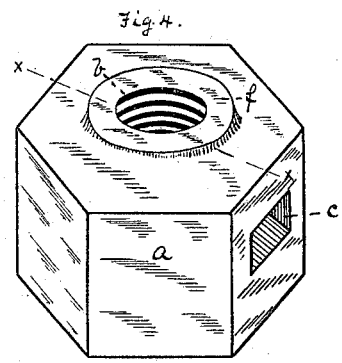
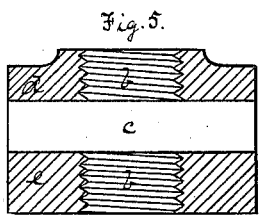
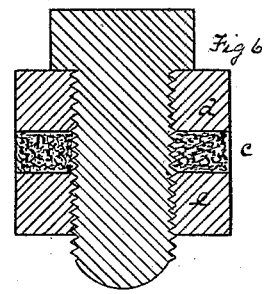
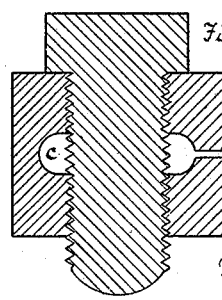
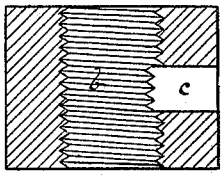
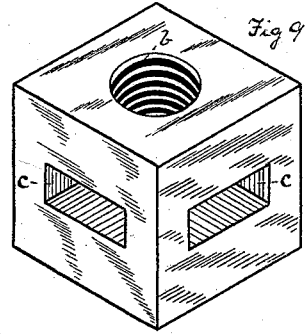
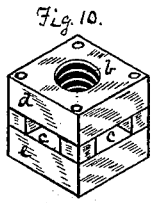
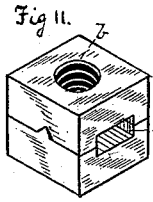
Witnesses
Jno. K. Smith
Robert C. Golden
Inventor
Samuel Gissinger.
by his attorneys
Bakewell & Kerr

UNITED STATES PATENT OFFICE.

SAMUEL GISSINGER, OF PITTSBURG, ASSIGNOR TO JOHN H. NOBLE, OF HULTON, PENNSYLVANIA.

NUT.

SPECIFICATION forming part of Letters Patent No. 298,843, dated May 20, 1884.

Application filed August 3, 1883. Renewed April 14, 1884. (No model.)

*To all whom it may concern:*

Be it known that I, SAMUEL GISSINGER, of Pittsburg, in the county of Allegheny and State of Pennsylvania, have invented a new and useful Improvement in Nuts; and I do hereby declare the following to be a full, clear, and exact description thereof.

My invention relates to an improvement in nuts; and it consists in a nut having a space or cavity communicating with or intersecting the bolt-hole, in combination with fibrous packing placed in the cavity and capable of being drawn between the thread of the nut and bolt, when the nut is screwed onto the bolt, so as to form a self-locking nut.

I am aware that nuts having an interior cavity communicating with or intersecting the bolt-hole, in combination with a non-fibrous material—such as india-rubber or soft metal—are not new, and also that pawls, pins, screws, and wedges have been used in combination with nuts having suitable cavities for the reception thereof, communicating with the bolt-hole. These packings, however, being non-fibrous, are incapable of being drawn between the threads, as the nut is screwed onto the bolt.

I will now describe my invention so that others skilled in the art may employ the same, reference being had to the accompanying drawings, forming part of this specification, in which—

Figure 1 is a perspective view of a nut having a cavity extending through the sides of the nut and intersecting the bolt-hole. Fig. 2 is a sectional view through the line $x\ x$, Fig. 1. Fig. 3 is a sectional view through the line $y\ y$, Fig. 1, of the nut of that figure on a bolt. Fig. 4 is a perspective view of a modified form. Fig. 5 is a sectional view through the line $x\ x$, Fig. 4. Fig. 6 is a sectional view through the line $x\ x$, Fig. 1, showing the nut of that figure on a bolt and the packing. Figs. 7, 8, 9, 10, and 11 are modified forms of nuts having cavities adapted to receive and retain a fibrous packing.

Like letters of reference indicate like parts wherever they occur.

In the drawings, $a$ represents the nut, in which is formed a cavity, $c$, either intersecting the bolt-hole $b$, as shown in Figs. 1 to 7 and 9 to 11, or merely communicating therewith, as shown in Fig. 8. I prefer to form the cavity, however, as shown in Fig. 1, extending in a line at right angles to the line of the axis of rotation of the bolt, through the nut, from side to side, of a greater width than the bolt-hole, and intersecting the same. An interior annular cavity around the bolt-hole, as shown in Fig. 7, may also be employed to answer the same purpose. These nuts may be manufactured either by pressing, forging, or casting, and the cavity may be formed at the same time, or by a subsequent operation.

In Figs. 10 and 11 the nut is shown formed in two pieces, which are united or fastened together in any convenient manner, as by welding, by a rust-joint, or by riveting; or they may be held in place relatively to each other when in use by making a radial groove or grooves in one face of the upper section, and a corresponding projection or projections in the corresponding face of the lower section. After the nut has been finished, the bolt-hole threaded, and the cavity formed, fibrous packing—such as cotton-waste, asbestus, or other suitable material—is placed in the cavity. When the nut is screwed onto the bolt, this packing engages with the thread of the bolt and is drawn between the threads of the nut and bolt, and thereby acts as a wedge or stop, so as to prevent the nut from jarring loose.

The advantages of my invention are, that the nut is self-locking, simple, and cheap and durable, that by using it the use of washers and nut-locks is dispensed with.

I do not claim in this specification the nut having a cavity arranged so as to form a spring-nut, as that feature of my invention is embodied in a separate application for an improvement in lock-nuts, filed by me September 13, 1883, Serial No. 106,296.

Having thus described my invention, what I claim, and desire to secure by Letters Patent, is—

A nut having a cavity communicating or intersecting the bolt-hole, in combination with fibrous packing capable of being drawn between the threads of the nut and the bolt, substantially as and for the purpose specified.

In testimony whereof I have hereunto set my hand this 25th day of July, A. D. 1883.

SAMUEL GISSINGER.

Witnesses:
THOMAS W. BAKEWELL,
JOHN S. KENNEDY.